United States Patent [19]

Parkinson

[11] 4,194,261
[45] Mar. 25, 1980

[54] HEATED WIPER ARRANGEMENT

[75] Inventor: Truman D. Parkinson, Chardon, Ohio

[73] Assignee: Tutco, Inc., Cookeville, Tenn.

[21] Appl. No.: 901,532

[22] Filed: May 1, 1978

[51] Int. Cl.² .............................................. B60S 1/04
[52] U.S. Cl. ................................ 15/250.07; 15/250.42
[58] Field of Search ...................... 15/250.06–250.09, 15/250.36, 250.42

[56] References Cited

U.S. PATENT DOCUMENTS

| 2,034,880 | 3/1936 | Sackett | 15/250.07 |
| 2,755,499 | 7/1956 | Mays | 15/250.06 |
| 2,903,732 | 9/1959 | Taylor et al. | 15/250.06 |
| 3,667,083 | 6/1972 | Linker | 15/250.06 |
| 4,152,808 | 5/1979 | Andregg | 15/250.42 |

FOREIGN PATENT DOCUMENTS 1906670 8/1970 Fed. Rep. of Germany ........ 15/250.07

Primary Examiner—Peter Feldman
Attorney, Agent, or Firm—Berman, Aisenberg & Platt

[57] ABSTRACT

A heated wiper arrangement for windshields and like surfaces including an elongated backing member having means along the inner face area thereof to retainingly receive an elongated wiper blade longitudinally therealong. A heating element is closely associated with the backing member at generally the neutral surface or plane thereof for heating the wiper blade by conduction. Location of the heating element at generally the backing member neutral surface or plane prevents stresses from being applied to the element during bending of the backing member for accommodating the windshield surface contour. The heating element may be advantageously located generally along the backing member longitudinal neutral or moment of inertia axis as well as at locations spaced laterally outward therefrom in the neutral surface. Means may also be advantageously provided for protecting the heating element from natural and other corrosive elements.

11 Claims, 6 Drawing Figures

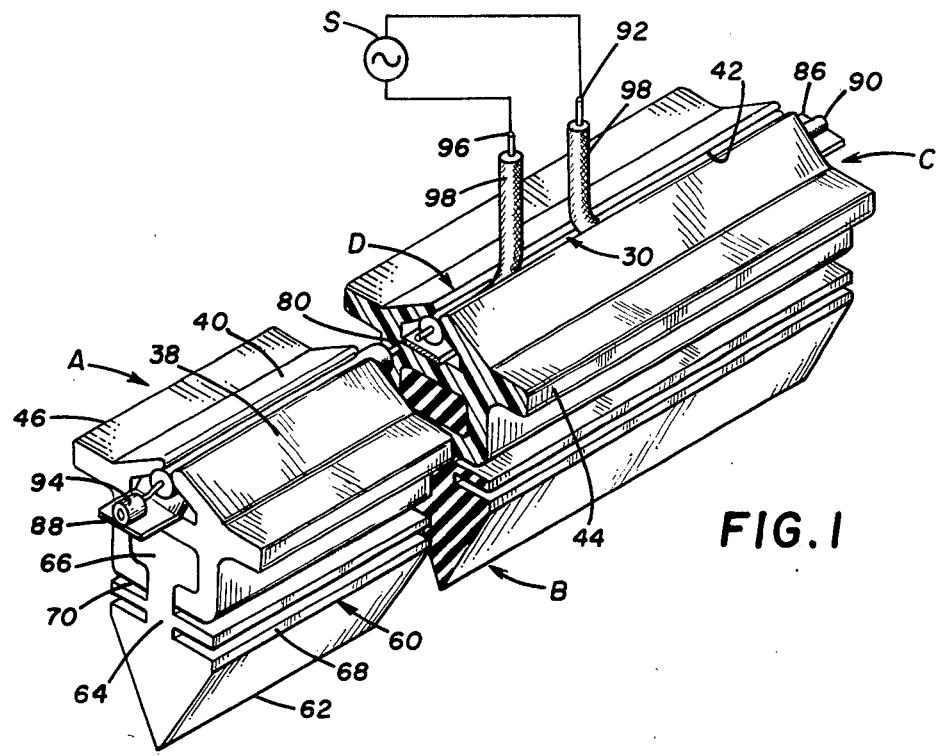
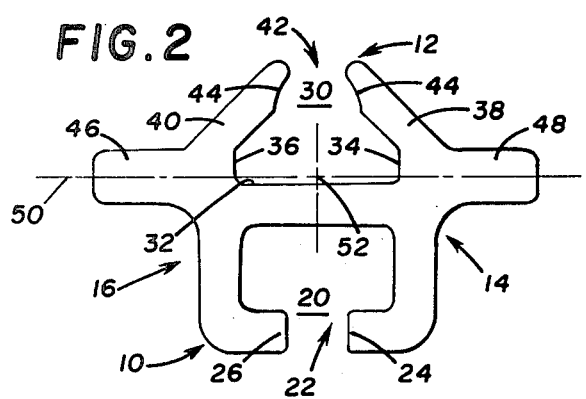
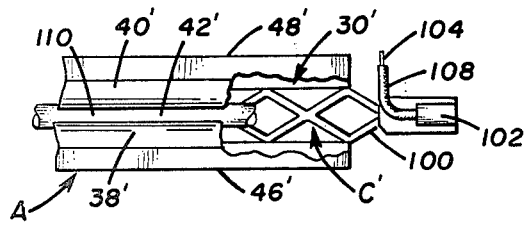
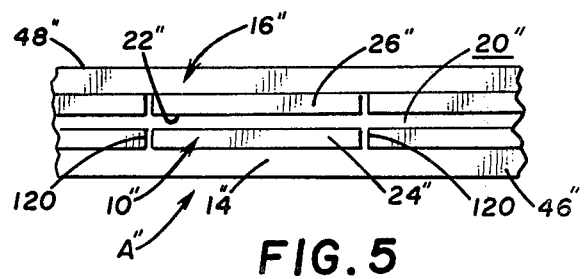
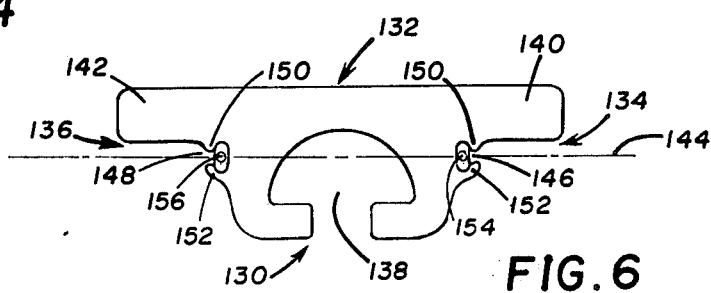

HEATED WIPER ARRANGEMENT

BACKGROUND OF THE INVENTION

This invention pertains to the art of windshield wipers and more particularly to heated windshield wiper arrangements.

The invention is particularly applicable to a heated windshield wiper arrangement for use on conventional vehicle windshields and will be described with particular reference thereto. However, it will be appreciated that the concepts of the present invention may be advantageously utilized in other environments where it is desired to wipe or otherwise clean a surface.

Heated windshield wipers as a broad general concept are known in the art and many prior designs have been patented and/or placed into use. Some prior designs have included the idea of embedding the heating element directly in the resilient wiper blade while others have focused on mounting some type of heating element to a backing member or to some other area of the overall wiper assembly. Still other prior arrangements have employed heating elements spaced closely adjacent the wiper blade for directly contacting the windshield surface. All of these prior designs and constructions have had certain inherent structural and operational deficiencies which have detracted from their overall efficiency in performing the desired wiping function.

Some of these difficulties have arisen from the complexity of prior designs which rendered them somewhat unreliable over a long period of time and which further rendered them difficult to maintain or repair.

Prior designs having the heating elements disposed directly in the wiper blade often made them cost prohibitive and lead to deterioration of the blade which detracted from their appeal in the general marketplace. Moreover, prior designs and constructions which had the heating element mounted in either the flexible wiper blade or to a blade backing member were such that the overall stiffness of the blade or backing member was increased to a point where it adversely affected resultant wipe quality. Simply increasing the wiper arm pressure increased the load per unit length on the wiper blade which caused it to fold excessively as the blade moved across the windshield. Here too, wipe quality was compromised.

Heretofore, prior windshield wiper assembly designs were such that it was not possible to effectively design around or compensate for the aforementioned stiffness problem. Moreover, the heating elements themselves were subjected to compression and/or tension stresses each time the wiper assembly was bent in the ordinary course of operation to conform to the windshield contour. These stresses oftentimes led to heating element failure requiring premature replacement of the entire wiper blade arrangement. Still further, many prior designs did not provide for protecting the associated heating elements such that they were exposed and subject to attack by natural and other corrosive elements. This too led to premature failure.

In view of the above noted problems with prior art heated windshield wiper designs, it has been found desirable to develop a new and improved arrangement which would overcome such problems and be more practical and acceptable for widespread use. The concepts of the subject invention are deemed to meet these needs and provide a new and improved heated windshield wiper arrangement which is simple in design, economical to manufacture, reliable, allows the blade assembly backing member to have the desired stiffness for achieving good wiping quality, does not stress the heating element and readily adapted to a number of different wiping applications.

BRIEF SUMMARY OF THE INVENTION

In accordance with the present invention, there is provided a new heated wiper assembly for windshields and other surfaces. The assembly includes an elongated wiper blade backing member constructed from a material which will allow at least some limited degree of bending flexure over the length thereof to accommodate the contour of an associated windshield or other surface. The backing member generally has inner, outer and opposed side face areas with the inner face area having blade mounting means extending longitudinally therealong. The backing member further includes means for receiving an elongated heating element in operative communication therewith at least substantially over the longitudinal length thereof. The receiving means includes a receiving zone disposed to fall generally within a neutral surface or plane passing longitudinally through the backing member laterally between the side face areas. This neutral surface includes the backing member longitudinal neutral or cross-sectional moment of inertia axis therein. An electrical heating element is disposed to extend longitudinally along the receiving zone and includes means adapted for connecting the element to a source of electrical energy disposed external of the wiper assembly. A flexible wiper blade having a mounting portion and at least one blade portion extending longitudinally therealong is affixed to the backing member at the mounting means. During operation, heat generated by the heating element passes by conduction through the backing member from the receiving zone to the wiper blade for allowing the blade to melt any frozen substances on the windshield or other surface.

In accordance with another aspect of the present invention, the heating element receiving means comprises a receiving groove extending inwardly into and longitudinally along the backing member with the innermost end wall of the groove defining the receiving zone. In one arrangement, the receiving groove is disposed in the backing member outer face area in a manner such that the receiving zone is generally coincident with the backing member longitudinal neutral or moment of inertia axis. In another arrangement, at least one receiving groove is disposed in at least one of the backing member side face areas within the neutral surface or plane.

In accordance with another aspect of the present invention, a protective filler is disposed in the receiving groove over the heating element for purposes of protecting it from external damage. In one arrangement, this protective filler comprises a separate filler member an in another arrangement, it comprises insulated electrical lead wires employed to electrically interconnect the heating element and the external source of electrical energy.

In one structural arrangement of the invention, the heating element is comprised of an expanded metal ribbon type of element which permits some longitudinal expansion and contraction thereof in response to any bending moments which may be incurred thereby during wiper assembly operation. In another structural arrangement, the heating element comprises a ribbon type of element having laterally disposed corrugations over the length thereof to similarly permit some degree of longitudinal expansion and contraction.

The principal object of the present invention is the provision of a new and improved heated wiper arrangement which is simple in design, easy to manufacture, which facilitates good wiping quality and which is readily adapted to use in a number of wiping environments such as windshields and like surfaces.

Another object of the present invention is the provision of a new and improved heated wiper arrangement wherein the heating element is advantageously positioned in a wiper blade backing member in a manner which does not adversely affect overall wiper arrangement stiffness.

Still another object of the present invention is the provision of a new and improved heated wiper arrangement which protects the heating element from natural and other corrosive elements.

Still other objects and advantages to the present invention will become apparent to those skilled in the art upon a reading and understanding of the following specification.

BRIEF DESCRIPTION OF THE DRAWINGS

The invention may take physical form in certain parts and arrangements of parts, preferred and alternative embodiments of which are described in detail in the specification and illustrated in the acompanying drawings which form a part hereof and wherein:

FIG. 1 is a perspective view of a heated wiper assembly incorporating the concepts of the subject invention;

FIG. 2 is an end view of the wiper blade backing member employed in FIG. 1;

FIG. 3 is a partial side elevational view of the heating element employed in FIG. 1;

FIG. 4 is a plan view in partial cross section showing an alternative heating element and protective filler arrangement;

FIG. 5 is a bottom view of the wiper blade backing member showing a modification thereto; and, FIG. 6 is a cross sectional view of an alternative wiper blade backing member configuration.

DESCRIPTION OF THE PREFERRED AND ALTERNATIVE EMBODIMENTS

Referring now to the drawings wherein the showings are for purposes of illustrating the preferred and alternative embodiments of the invention only and not for purposes of limiting same, FIG. 1 shows a heated wiper assembly comprised of a backing member A, a wiper blade B, a heating element C and electrical leads D. In the arrangement of FIG. 1, leads D also function as a protective filler for heating element C. The concepts of the subject invention are particularly applicable to a windshield wiper assembly for conventional vehicles and will be described with reference thereto. However, it should be appreciated that the overall inventive concepts could be advantageously applied to wiper assemblies used in other environments. In a windshield type environment, the assembly shown in FIG. 1 is affixed to a wiper arm (not shown) as is known in the art.

With particular reference to both FIGS. 1 and 2, backing member A has a length sufficient to accommodate the desired length of wiper blade B. In cross section, the backing member has an inner face area generally designated 10, an outer face area generally designated 12 and opposed side face areas generally designated 14,16. A generally T-shaped blade mounting groove 20 extends inwardly into the backing member body from an entrance area 22 at inner face area 10. Entrance area 22 is itself defined between a pair of spaced apart leg-like members 24,26. Receiving groove 20 extends longitudinally of the backing member over the entire length thereof.

A heating element receiving groove generally designated 30 is disposed in backing member A at outer face area 12 to also extend longitudinally over the length thereof. This groove has a substantially flat bottom wall 32 and a pair of opposed generally straight side walls 34,36. Bottom wall 32 and blade receiving groove 20 are separated from each other by a web-like area in the backing member. The positioning of bottom wall 32 is of particular importance for achieving the overall advantageous results as will become more readily apparent hereinafter. A pair of legs 38,40 converge toward each other from side walls 34,36 to define a top wall area for the groove as well as an entrance area 42 at the spaced apart terminal ends thereof. While the particular configuration of element receiving groove 30 may be varied, in the preferred arrangement here under discussion, legs 38,40 converge toward each other at approximately 45° angles relative to flat bottom wall 32. Arcuate relief areas 44 are provided adjacent the terminal end of these legs for defining a receiving area for a protective filler as will be described hereinafter.

A support rib 46 extends outwardly from and longitudinally along side face area 14 and a support rib 48 is similarly disposed relative to side face area 16. These ribs provide convenient support for the backing member and, in some instances, may be used in mounting the overall wiper assembly in its environment of use.

A number of materials may be advantageously employed for constructing backing member A. However, in the preferred arrangement, a phenylene oxide or polycarbonate resin is preferred. However, any high temperature thermoplastic resin as well as other insulating materials could be advantageously employed. The benefits obtained in constructing the backing member from the preferred materials is that the member has a degree of rigidity while still allowing some flexibility or bending over the length thereof to accommodate wiping over the changing surface contour of an associated windshield. Backing member A may be easily extruded in a continuous manner by known techniques and then cut to appropriate lengths.

Backing member A also includes what is commonly referred to as a neutral surface or plane which passes longitudinally therethrough. The existence of such a surface is recognized in the art and is explained in, for example, S. Timoshenko, Strength Of Materials, Part 1, Elementary Theory And Problems (2d ed. 1940) at pp. 88–91. Since the existence of the neutral surface in a loaded beam is known and does not itself form a part of the present invention, a further discussion is not provided thereon. In FIG. 2, the area of this plane is designated by numeral 50 and extends longitudinally through the backing member between the distal or outermost lateral ends of support ribs 48,46 at side face areas 14,16, respectively. The location of surface or plane 50 and the location of a longitudinal neutral or cross-sectional moment of inertia axis 52 within this plane may be calculated for an irregular body such as backing member A by conventional mathematical techniques. As these techniques are also known and do not form a part of the present invention, they are not described further herein. Heating element receiving groove 30 is dimensioned so that flat bottom wall 32 is coplanar or at least substantially adjacent and coextensive with plane 50 over the longitudinal extent thereof. Moreover, the backing member configuration shown in FIG. 2 in such that axis 52 is generally centrally located relative to bottom wall 32.

A particularly desirable physical characteristic of backing member A at the location for the area of the neutral surface or plane is that surface 50 does not undergo any strain during backing member loading or bending over the longitudinal extent thereof. That is, and as the backing member is loaded in much the same manner as a beam for purposes of accommodating windshield contour, that area on the convex side thereof undergoes tension or extension and that area on the concave side undergoes compression. However, the area at neutral surface 50 does not undergo any strain. Accordingly, flat bottom wall 32 of the element receiving groove defines a heating element receiving zone which itself undergoes very little or no strain during backing member bending. Depending on the precise location of bottom wall 32 relative to neutral surface 50, some very slight stresses may be incurred.

Referring again to FIG. 1, wiper blade B has a blade body generally designated 60 which itself includes an outer wiping surface or edge generally designated 62. A neck-like area 64 protrudes outwardly from the blade body on the other side thereof from wiping surface 62 and includes a mounting protuberance 66 at the outermost end thereof. A pair of opposed rib-like areas 68,70 extend transversely outward from neck-like area 64 intermediate blade body 60 and mounting protuberance 66. In the arrangement shown, the mounting protuberance is configured so as to be closely received in backing member receiving groove 20. However, the protuberance and groove may take cooperative relationships and configurations other than the one specifically shown in FIGS. 1 and 2 without in any way departing from the overall intent or scope of the present invention. Wiper blade B is typically constructed from rubber or a rubber-like material and may also take other shapes and forms from that specifically shown in FIG. 1.

FIG. 3 shows a partial side view of the heating element C incorporated into the assembly of FIG. 1. In this FIGURE, the heating element is shown as having an elongated body 80 comprised of a plurality of upper corrugations 82 and lower corrugations 84. These corrugations extend laterally across the width of body 80 over the longitudinal extent thereof between opposed end areas 86,88. The heating element may be constructed from any standard metal or alloy used in resistance heating applications such as nichrome or the like.

A lead wire clamp 90 is fixedly secured to end area 86 by convenient means such as welding or the like. One end of a lead wire 92 is received in clamp 90 and fixedly secured therein as by crimping or the like. In the corrosive environment of a windshield wiper, that is, contact with salt, solvents, water and so on, a simple crimp between the heating element and lead wire would fail after some exposure thereto. Accordingly, following the connection of lead wire 92 to heating element end area 86 as described above, the connection area is dipped in a sealant such as silicone, rubber or a high temperature polymer to provide a corrosion resistant connection. If desired, a small plastic cap (not shown) could also be used to complete or finish the backing member end, cover the electrical connection and provide a securing clip. in FIG. 1, a lead wire clamp 94 affixed to heating element end 88 receives one end of a lead wire 96 in the same manner hereinabove described with reference to clamp 90 and lead wire 92.

In the arrangement shown in FIGS. 1 and 3, lead wires 92,96 include a conventional resilient, plastic-like protective insulation 98 closely surrounding the wires. In the arrangement of FIG. 1, the insulation not only protects the lead wires, but also protects the heating element once it has been installed into receiving groove 30. This latter feature will become more readily apparent hereinafter.

With the above described backing member and wiper blade structures, heating element C is passed into receiving groove 30 from one end thereof in a manner such that heating element end areas 86,88 with lead wire clamps 90,94 extend slightly outwardly from the opposite backing member end faces. The length of the heating element is determined by the necessary length of the backing member and wiper blade to accommodate a particular application. When so installed, the element is in the receiving zone with lower corrugations 84 resting on receiving groove flat bottom wall 32. Thus, the heating element is disposed coplanar or at least substantially adjacent and coextensive with neutral surface or plane 50 of the backing member.

Lead wires 92,96 are then located along the length of the heating element as is shown in FIG. 1 in a manner such that they may be received at least into entrance area 42 of heating element receiving groove 30. Insulation cover 98 for both of lead wires 92,96 is conveniently dimensioned to have a diameter slightly larger than the width of entrance area 42. Thus, upon a pressed insertion of the lead wires into the receiving groove, cover 98 is retainingly received by arcuate relief areas 44 disposed adjacent the ends of legs 38,40. Lead wires 92,96 may exit from backing member receiving groove 30 at some convenient location therealong for operative interconnection to an external source S of electrical energy. This source has been schematically shown in FIG. 1 and may comprise any number of source and control arrangements which themselves do not form a part of the present invention. While the lead wires have been shown in FIG. 1 as exiting receiving groove 30 at some intermediate location between the backing member end faces, it is entirely possible and within the scope of the present invention to have these wires exit at other locations to accommodate some particular installation. For example, one lead wire could extend entirely across the heating element from one end of backing member A to the other and exit at that point along with the other lead wire. In this manner, neither lead wire would have to exit receiving groove 30 at some intermediate position. To some extent, the lead wire arrangement will depend upon the overall assembly design criteria and the type of heating element utilized. Other alternative arrangements are equally applicable and one such alternative will be described in greater detail hereinafter.

The insulation or protective covering 98 for lead wires 92,96 performs a two fold function in the FIG. 1 arrangement. First, it acts to retain the heating element in a desired position within groove 30 and second, it acts as a protective filler over substantially the entire length of the heating element. Both of these functions are deemed equally important because of the sometimes rough usage which a windshield wiper assembly encounters and also because of the corrosive environment to which a windshield wiper assembly is subjected i.e., salt, solvents, the like.

When the above described wiper assembly construction has been conveniently mounted for operation in wiping communication with a vehicle windshield, the contour of the windshield is such that wiper blade B and backing member A will incur some bending or loading over the longitudinal length thereof. Since heating element C is disposed at the receiving zone defined by receiving groove flat bottom wall 32 at generally the neutral surface or plane of backing member A, such bending or flexure of the backing member will cause very little or no longitudinal stress in the heating element over the length thereof.

The generally corrugated configuration of the heating element provides some spring pressure against the protective filler as it is defined by lead wire insulation 98 to assist in retaining it in position. Still further, this corrugated configuration enhances the unit flexibility by providng flat shoe-like surfaces for the slight, residual translational motion in groove 30 and by allowing for some longitudinal expansion and/or contraction should it be necessary. Since the heating element is disposed generally along the backing member neutral surface, it will not really affect the backing member stiffness properties. However, some slight stresses may be imparted to the heating element during backing member bending due to the fact that the heating element configuration may extend slightly above and/or below the neutral surface. This is simply due to the fact that the effective thickness of the heating element is greater than the effective thickness of the neutral surface.

During operation, and when electrical energy is applied across lead wires 92,96 by source S, resistance type heating element C is heated. The heat generated is transferred by conduction to backing member A with a minor or small portion of the heat then further transferred by conduction to wiper blade B. The heated backing member prevents the accumulation of snow and ice on the wiper assembly which can compromise the overall quality of the wiping action obtained. That small portion of the heat transferred to the wiper blade assists in preventing snow and ice accumulation on the blade which can also compromise the quality of wiping action to some extent. Source S may include control means (not shown) for conveniently allowing selective control of heating element operation. For example, such control means could provide for heating element on and off conditions as well as intermittent or continuous operation. Typically, the design of the assembly is such that the heating element is operated at relative low temperatures, i.e., on the order of 235° F. or less. This prevents any damage to the plastic backing member.

FIG. 4 shows a modified wiper assembly incorporating the overall inventive concepts thereinto. For ease of illustration and appreciation of the modification, like components are identified by like numerals with the inclusion of a primed (') suffix and new components are identified by new numerals.

In FIG. 4, heating element C' is comprised of an expanded metal type of resistance heating element having a body 100. Such an element may be formed in accordance with, for example, the disclosure contained in U.S. Pat. No. 3,651,304, the concepts of which are incorporated hereinto by reference. Here too, any standard resistance heating metal or alloy may be advantageously employed for constructing body 100. Since the specific construction features of the heating element do not form a part of the present invention, they are not disclosed in greater detail herein.

A lead wire clamp 102 is operably affixed to one end of heating element 100 by means similar to that previously described hereinabove. An electrical lead wire 104 is operably affixed to the heating element by means of clamp 102 and includes an outer protective coating 108. As will be seen from FIG. 4, the lead wire is operably connected to the heating element at one end thereof which, in some instances, may render the interconnection with a source of electrical energy somewhat easier. Such interconnection could also be advantageously practiced with other types of alternative and available heating elements.

A separate protective filler member 110 is retainingly received in receiving groove 30' adjacent entrance opening 42'. This protective filler may be formed from any number of materials, although a resilient or flexible material such as an elastomeric is deemed preferred. The filler is dimensioned in much the manner and performs the same function as insulation 98 described above with reference to FIGS. 1 and 3. If desired for some particular application, the electrical lead wire may be passed along the top of the heating element and beneath filler 110 for exit from the backing member at some other area than is shown in FIG. 4. Due to the nature of the expanded metal type of heating element shown in FIG. 4, it too may expand and/or contract slightly to accommodate any small stresses imparted thereto during wiper assembly use.

FIG. 5 shows a modification to the backing member for adjusting the effective neutral surface or plane thereof. For ease of illustration in this FIGURE, like components are identified by like numerals with the inclusion of a double primed (") suffix and new components are identified by new numerals.

FIG. 5 shows a plurality of slots 120 extending laterally across backing member A" at inner face area 10". These slots extend into the inner face area between side face areas 14",16" to a point immediately adjacent support ribs 44",46" and define slice-like areas laterally across and through T-shaped blade mounting groove 20". Slots 120 are spaced along the entire length of backing member inner face area 10" at appropriate intervals which may, in some instances, be approximately 1" or so. The purpose of slots 120 is simply to adjust the effective location of the neutral surface when it is calculated with reference to the combined backing member and wiper blade structure. The arrangement of FIG. 5 has the effect of raising the position of the neutral surface to the location designated by numeral 50 in FIG. 2. Slots 120 reduce the backing member stiffness when bending moments are applied thereto.

FIG. 6 is directed to a modified form for the backing member to permit location of a heating element at other locations relative thereto in the backing member neutral surface. In this FIGURE, the backing member has an inner face area 130, an outer face area 132 and a pair of opposed side face areas 134,136. Extending inwardly into the backing member body from inner face area 130 is a generally T-shaped mounting groove 138 adapted to receive a blade member as previously described. A pair of support or reinforcing ribs 140,142 extend outwardly from side face areas 134,136, respectively, adjacent outer face area 132.

The neutral surface or plane in this embodiment is designated by numeral 144 and passes through a pair of receiving grooves 146,148 extending inwardly from side face areas 134,136 immediately below support ribs 140,142. Here, receiving grooves 146,148 are spaced transversely or outboard from the backing member cross sectional moment of inertia. Also, each groove advantageously includes retaining lips 150, 152 for retainingly receiving an associated heating element. Grooves 146,148 are spaced from mounting groove 138 by backing member web-like areas with the innermost groove wall areas defining heating element receiving zones. Heating elements 154,156 are closely received in grooves 146,148, respectively, generally at or in neutral surface 144 to achieve the overall desired benefits as described above with reference to FIGS. 1–3. Heating elements 154,156 are constructed of any conventional or standard resistance heating metal or alloy and may also include a protective covering to prevent corrosive attack from the surrounding environmental elements.

In addition to the specific arrangements hereinabove described, other arrangements could also be advantageously employed for the backing member construction, construction of the specific heating element, interconnection of the heating element with the lead wires for providing a protective filler for the heating element receiving groove. By way of example, the heating element could be pressed into the plastic backing member while the plastic was soft during the extrusion process. Alternatively, the element can be embedded in its backing member receiving groove using the element itself as the heat source. In this instance, operating temperature for the heating element may be raised from normal operating temperatures to locally soften the plastic as needed for securing the element in the receiving groove.

The invention has been described with reference to preferred and alternative embodiments. Obviously, modifications and alterations will occur to others upon the reading and understanding of this specification. It is my intention to include all such modifications and alterations insofar as they come within the scope of the appended claims or the equivalents thereof.

Having thus described my invention, I now claim:

1. A heated wiper assembly for windshields and like surfaces comprising: an elongated wiper blade backing member constructed from a material designed to permit said member to flex over at least a portion of its longitudinal extent to conform to the contour of a surface to be wiped, said backing member having inner, outer and opposed side face areas with said inner face area having a wiper blade mounting groove extending longitudinally therealong and said backing member further including means for receiving an elongated heating element in operative communication therewith at least substantially over the longitudinal length thereof; an electrical heating element disposed in said receiving means; and means for preventing said heating element from being subjected to bending stresses imparted to said backing member during a wiping operation, comprising at least one inwardly extending open groove in said receiving means for receiving said heating element, said at least one groove comprising a wall area substantially located in the neutral zone of said backing member and said heating element extending along said wall area.

2. The assembly as defined in claim 1 wherein said at least one groove extends inwardly from said backing member outer face area toward said inner face area longitudinally therealong with the innermost end wall of said groove defining said wall area and including the longitudinal neutral axis of said backing member, said wall area and said wiper blade mounting groove being separated from each other by a backing member web area.

3. The assembly as defined in claim 2 further including a protective filler disposed in said at least one groove between said heating element and backing member outer face area at least over a substantial portion of the length thereof.

4. The assembly as defined in claim 2 further including a pair of electrical lead wires each having one end connected to said heating element and the other end adapted to be connected to an external source of electrical energy, a portion of at least one of said lead wires extending from said one end toward said other end being received in said at least one groove over at least a portion of the length of said heating element.

5. The assembly as defined in claim 4 further including a protective filler retainingly received in said at least one groove and covering at least a substantial portion of the length of said heating element.

6. The assembly as defined in claim 5 wherein said protective filler comprises an insulating cover closely surrounding said at least one lead wire.

7. The assembly as defined in claim 2 wherein said heating element comprises an expanded metal type of element which permits some longitudinal expansion and contraction thereof in said receiving zone.

8. The assembly as defined in claim 2 wherein said heating element comprises a ribbon type of element having laterally disposed corrugations over the length thereof which permit some longitudinal expansion and contraction thereof along said wall area.

9. The assembly as defined in claim 1 wherein said at least one groove extends inwardly into and longitudinally along at least one of said backing member side face areas with the innermost end wall of said groove defining said wall area, said wall area and mounting groove being separated from each other by a backing member web area.

10. The assembly as defined in claim 9 wherein said receiving means comprises a pair of said grooves extending inwardly into and longitudinally along both of said backing member side face areas.

11. The assembly as defined in claim 1 further including a plurality of slots extending laterally across said wiper blade mounting groove at spaced apart intervals along the longitudinal extent thereof.

* * * * *